United States Patent [19]
Dixon et al.

[11] Patent Number: 5,806,629
[45] Date of Patent: Sep. 15, 1998

[54] APPARATUS AND METHOD FOR SERVICE OF AN AUTOMOTIVE AUTOMATIC TRANSMISSION

[75] Inventors: Patrick Lewis Dixon, San Dimas, Calif.; Todd Michael Rounds, Orlando, Fla.; Michael Joseph Camacho, Rancho Cucamonga, Calif.

[73] Assignee: Wynn Oil Company, Azusa, Calif.

[21] Appl. No.: 816,486

[22] Filed: Mar. 13, 1997

[51] Int. Cl.$^6$ ....................................................... F16C 3/14
[52] U.S. Cl. .............................................. 184/1.5; 141/98
[58] Field of Search ................................... 184/1.5, 6.12; 141/98

[56] References Cited

U.S. PATENT DOCUMENTS

| | | |
|---|---|---|
| 3,513,941 | 5/1970 | Becnel . |
| 5,203,429 | 4/1993 | Zager . |
| 5,209,198 | 5/1993 | Bedi . |
| 5,242,032 | 9/1993 | Prestwood et al. . |
| 5,291,968 | 3/1994 | Brown . |
| 5,318,080 | 6/1994 | Viken . |
| 5,318,700 | 6/1994 | Dixon et al. . |
| 5,337,708 | 8/1994 | Chen . |
| 5,361,870 | 11/1994 | Courcy . |
| 5,370,160 | 12/1994 | Parker . |
| 5,415,247 | 5/1995 | Knorr ........................................ 184/1.5 |
| 5,427,202 | 6/1995 | Behring et al. . |
| 5,447,184 | 9/1995 | Betancourt . |
| 5,472,064 | 12/1995 | Viken . |
| 5,495,916 | 3/1996 | DiMatteo . |
| 5,522,474 | 6/1996 | Burman . |
| 5,535,849 | 7/1996 | Few ........................................... 184/1.5 |
| 5,546,999 | 8/1996 | Parker . |
| 5,562,181 | 10/1996 | Elkin et al. . |
| 5,586,583 | 12/1996 | Edwards et al. . |

*Primary Examiner*—Thomas E. Denion
*Attorney, Agent, or Firm*—Terry L. Miller

[57] ABSTRACT

A fail-safe transmission service machine allows old ATF to be pumped out of a transmission while the vehicle engine runs, and responsively pumps a matching volume of new ATF into the transmission so that dry running of the transmission can not occur. If the supply of new ATF runs out or if power to the service machine is interrupted, the machine reverts to closed loop fluid circulation for the transmission. A hydraulic rectifier provides for universal connection of hoses between the transmission cooler fluid circulation loop of the vehicle and the service machine. An alternative embodiment of the machine allows for similarly fail-safe exchange of power steering fluid from a vehicle, and replacement of the old fluid with new power steering fluid.

17 Claims, 2 Drawing Sheets

APPARATUS AND METHOD FOR SERVICE OF AN AUTOMOTIVE AUTOMATIC TRANSMISSION

BACKGROUND OF THE INVENTION

1. Field of the Invention

The present invention is in the field of apparatus and method used to effect exchange of fluid from a system of an automobile. For example, the apparatus and method may be used to change automatic transmission fluid (ATF) from an automotive automatic transmission. The apparatus and method may also be used to change power steering fluid from an automotive power steering system. More particularly, the present invention relates to a fail-safe machine and to a method of its operation and use in exchanging the used ATF of an automatic transmission with fresh ATF, or in exchanging used power steering fluid with fresh fluid, and which is very economical in its construction, energy efficient in its operation, environmentally responsible, and uniquely easy to use for the automotive technician.

2. Related Technology

Many conventional machines and methodologies presently exist for withdrawing the used ATF from an automotive automatic transmission, while simultaneously replacing the used fluid with new. These devices and methods are a response to the widely-held recognition that simply dropping the pan from an automatic transmission while doing a filter change (or draining the pan of those transmissions fitted with a drain plug), and then refilling the transmission to the proper level with new fluid results in more than half of the old contaminated ATF remaining in the transmission. Such is the case because, for example, the clutch actuators, control valves, pump(s), ATF cooler and connecting conduits, and torque converter of the transmission still hold old ATF. In order to extract this old ATF from the transmission, the vehicle engine must be operated while a fluid exchange for the transmission is in progress.

This operation of the vehicle engine is usually accomplished on a chassis roller set allowing the drive wheels to spin and the clutches of the transmission to be cycled. Operation of the vehicle engine powers the internal fluid pump of the transmission and also facilitates flow of ATF through the torque converter and other parts of the transmission system, effectively flushing out the old ATF and replacing it with new fluid. Alternatively, the vehicle engine can be run with the transmission in "neutral" or "park", with most of the old ATF being exchanged in this way (i.e., without the drive wheels spinning or the transmission clutches being cycled). In this latter case, the old ATF will still be flushed from the torque converter, ATF cooler, and connecting conduits of the transmission system.

Unfortunately, this operation of the vehicle engine creates a risk that the transmission can be damaged or destroyed by dry running. That is, if the old transmission fluid is drained out, and the transmission is not simultaneously refilled with sufficient new fluid so that the fluid level in the transmission drops too low, then the transmission can be damaged by dry running. In some situations, the old ATF is drained out by opening an ATF cooler connection conduit while the vehicle engine is running, and infusing new ATF at the fill tube of the transmission only when bubbles of air are observed to drain also with the ATF from the transmission. These bubbles are an indication that the fluid level of the transmission is low enough that its internal pump is drawing air. AT this time, a dose of new transmission fluid is added via the fill tube of the transmission. In this case, the new transmission fluid may be allowed to partially or completely drain out (perhaps while the attendant is distracted or absent for some reason), and the transmission can be damaged. To be done safely, this method requires the full-time attention of two attendants—one to watch the draining ATF and signal the presence of bubbles, and one to infuse new ATF at the fill tube in response to a signal from the first attendant. Obviously, this method is both labor intensive and prone to error.

In other situations, the supply of new ATF available to the service machine is inadequate or has been allowed to run completely out of the service machine to begin with (the attendant may not check to see that a reservoir for new ATF actually holds an adequate supply, for example). Again, a sufficient infusion of new ATF into the transmission may not take place during the service procedure with resulting damage to the vehicle transmission.

Still alternatively, an external power failure to the transmission service machine may occur during the service process, with the vehicle under service still running. This may result in the vehicle running without sufficient ATF in the transmission or with its external transmission cooler loop open and the fluid from the transmission being pumped to waste. Again, transmission damage can result unless the attendant catches this situation early enough.

Accordingly, a desire and a recognized need exists to safely and economically effect the replacement with new ATF of substantially all of the used ATF in an automatic transmission. Unfortunately, many of the machines and methods presently existing for this purpose suffer from one or more of the deficiencies of being ineffective in their service of the transmission (i.e., allowing some of the used fluid to remain in the transmission), possibly resulting in damage to the transmission if not closely attended, or are complex in their construction or operation.

For example, a cleaning machine for an automotive automatic transmission is known according to U.S. Pat. No. 5,337,708, issued 16 Aug. 1994 to We-Yu Chen. The '708 patent is believed to teach a transmission fluid change machine in which an external ATF circulation loop of the transmission is opened, with part of the machine completing this loop in one mode of operation. The used transmission fluid, possibly with a transmission flushing solution, is circulated in the external circulation loop as completed by the machine. When operated in an exchange/refill mode, the machine receives old transmission fluid and supplies new fluid at a selected pressure or volume delivery rate.

The Chen machine is intended to be operated from the 12 volt power supply of the automobile or other automotive vehicle being serviced. The new transmission fluid tank of this device appears to be provided with a level sensor, so that the system can be reverted to loop configuration (filtration/flushing) should the level of new ATF drop too low. An external power-driven pump is utilized to move new ATF from the fluid tank to the transmission being serviced. However, it is not clear from this patent that in the event the power supply to this device is interrupted or the pump ceases to operate, that the configuration of the device is reverted to loop form so that the transmission of the vehicle being serviced is not damaged by being operated with insufficient ATF. Although this patent asserts that a power failure will cause reversion of the apparatus to loop configuration in the event of a power failure, how this change in configuration is to be effected or powered does not appear to be explained.

Another transmission fluid change apparatus is disclosed by U.S. Pat. No. 5,318,080, issued 7 Jun. 1994 to James P. Viken. The '080 patent is believed to disclose an apparatus in which supply of the new ATF is provided by a pressurized storage container, which container is pressurized by the inflow of used ATF pumped from the transmission by its own internal pump. The storage container has a chamber which is separated by a flexible wall (i.e., a rolling-diaphragm piston) into two sub-chambers expanding and contracting in opposition. As used ATF from the transmission is received into one sub-chamber, new ATF is displaced from the other sub-chamber to the transmission. Another embodiment of this device uses two separate containers, one receiving the old ATF and the other holding new ATF. Air displaced from the one container is routed into the other with the idea that the air will drive the new ATF into the transmission. A pressurized air assist to this delivery of new fluid is provided. There is considerable uncertainty with these machines that the rate of new fluid delivery really matches the rate of old fluid draining from the transmission under service.

A transmission service machine is also known according to U.S. Pat. No. 5,370,160, issued 6 Dec. 1994 to Zachary T. Parker. The '160 patent is believed to disclose a service machine in which the external ATF fluid return loop for the transmission is completed by a reservoir from which the fluid is drawn by a pump. Accordingly, in the event that operation of the pump is interrupted while the serviced vehicle continues to operate, the transmission of the vehicle is at risk of damage from dry running. A separate pump is used to supply new ATF to the transmission, but this pump may suffer from the same power supply interruption, so that the transmission is still at risk of damage from dry running. The Parker '160 patent does not appear to provide a closed external ATF circulation loop for the transmission being serviced (other than the one relying on operation of an external power-driven pump), and does not use a three-way valve to complete or open such an external ATF circulation loop.

Still another apparatus for exchanging the fluid of an automatic transmission is known in accord with U.S. Pat. No. 5,447,184, issued 5 Sep. 1995 to Eduardo Betancourt. The '184 patent is believed to disclose an apparatus in which a reservoir for new ATF is provided so that the volume of new fluid supplied to the transmission can exceed the withdrawn volume. The '184 patent appears to include a sensor operating a bell to bring the attendant's attention to the fact that the supply of new ATF is at risk of running out. However, if the attendant is either not close at hand to hear the bell or is inattentive, the transmission may still be damaged if the supply of new ATF runs out while the transmission is being flushed. Still further, the device taught by the '184 patent is not believed to provide any safeguard to protect the automatic transmission in the event of a power failure to the apparatus while the transmission is being flushed during operation.

Finally, another automatic transmission flush apparatus is known according to U.S. Pat. No. 5,472,064, issued 5 Dec. 1995. The feature which the '064 patent appears to contribute to the art is the use of a conventional directional flow control valve. This flow control valve is inserted into the fluid flow conduits connecting the service machine to the external loop of the transmission, and allows connection of the apparatus to the external ATF circulation loop (i.e., the ATF cooler loop) of the transmission with no need to take note of the direction of fluid circulation in this loop. If the internal fluid flow direction of the machine happens to be correct as connected, there is no need to change the valve position. In the event the internal fluid flow direction of the machine is opposite to that of the transmission connection, then reversing the position of the flow control direction valve will match the internal flow direction to the direction of the fluid flow in the external ATF flow loop of the transmission. This machine requires attention and manual intervention of the technician to correct the fluid flow directions so that service can begin in the event that by chance these connections to the transmission are not right to begin with.

SUMMARY OF THE INVENTION

In view of the deficiencies of the conventional art, a primary object for this invention is to avoid one or more of these deficiencies.

Another object is to provide a fail-safe automatic transmission service machine.

Yet another object is to provide a machine for exchanging old fluid with fresh fluid in an automotive power steering system.

Accordingly, the present invention provides a method of exchanging used ATF with new ATF in an automotive automatic transmission having an internal pump and an external fluid circulation loop, and without limitation on the volume of ATF which can be exchanged, the method comprising steps of providing a source of new ATF; connecting a positive displacement motor/pump unit into the external fluid circulation loop, so that the loop is opened and old ATF from the transmission flows via a motor portion of the motor/pump unit to waste by reason of pressure provided by the internal transmission pump and drives the pump portion of the motor/pump unit, and flowing new ATF from the source through the pump portion of the motor/pump unit to the automatic transmission so as to effect a pseudo-closing of the external fluid circulation loop, whereby used ATF pumped out of the transmission by the internal pump is continuously replaced in equal volume with new ATF from the source by the motor/pump unit.

According to another aspect, the present invention provides a fail-safe transmission fluid exchange machine for an automotive automatic transmission, which automatic transmission includes an internal pump moving automatic transmission fluid (ATF) through an external circulation loop, the machine comprising: a conduit for conducting ATF from the external ATF circulation loop, a three-way valve in a first position communicating ATF received via the first conduit from the external circulation loop to a second conduit, which second conduit returns ATF to the external ATF circulation loop, the three-way valve in a second position thereof communicating ATF from the external ATF circulation loop to waste; a yieldably-biased back-drivable actuator which when actuated moves the three-way valve from the first to the second position thereof and which when deactivated returns the three-way valve to the first position by self-bias; a container for holding a supply of new ATF; a sensor for indicating when the container holds an adequate supply of new ATF; a pump receiving new ATF from the container therefor and supplying the new ATF pressurized via the second conduit to the external ATF circulation loop; a control system interconnecting the pump, the sensor, and the actuator to allow actuation of the actuator to place the three-way valve in the second position only while the sensor indicates an adequate supply of new ATF, the control system deactivating the actuator in the event of an inadequate supply of new ATF to allow the three-way valve to be returned to the first position by self-bias of the actuator.

A better understanding of the present invention will be obtained from reading the following description of a single exemplary preferred embodiment of the present invention taken in conjunction with the appended drawing Figures. It will be understood that the appended drawing Figures and description here following relate only to one exemplary preferred embodiment of the invention, and as such, are not to be taken as implying a limitation on the invention. No such limitation on the invention is implied, and none is to be inferred.

BRIEF DESCRIPTION OF THE DRAWING FIGURES

FIG. 1 provides a fragmentary pictorial and somewhat schematic depiction of an automobile having its automatic transmission serviced by a machine embodying the present invention;

FIG. 2 is a schematic representation of automobile power train (engine and transmission) as well as the transmission service machine seen in FIG. 1, and depicts alternative modes of operation (or fluid flow paths) utilized during the servicing of the transmission;

FIG. 3, provides a perspective view of a motor/pump unit used in the transmission service machine seen in FIGS. 1 and 2, and is shown with the housing of this motor/pump illustrated in phantom lines for improved clarity of description; and FIG. 4 provides a schematic representation of an automotive power steering system, during servicing to exchange old fluid with fresh fluid using a machine and method according to the present invention.

DETAILED DESCRIPTION OF AN EXEMPLARY PREFERRED EMBODIMENT OF THE INVENTION

Figure 1:
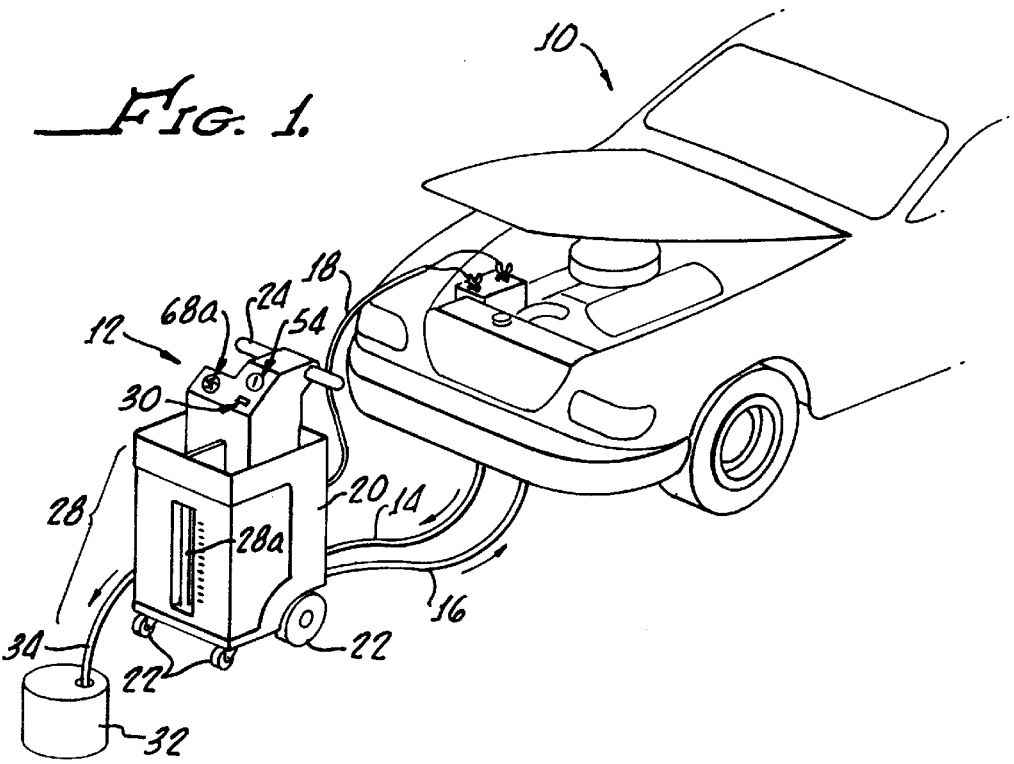

Referring to FIG. 1, an automotive vehicle 10 is seen having its automatic transmission serviced by use of a fail-safe machine 12 embodying the present invention. It will be understood that the vehicle 10 is illustrative only, and that other types of automotive vehicles may have their transmissions serviced by use of the machine 12. For example, some heavy trucks and buses use automatic transmissions, which also may be serviced in the way described below.

In general view, it is seen that the machine 12 is connected to the vehicle 10 in two respects. First, the machine 12 is connected by a pair of hoses 14 and 16 to the transmission cooling fluid circuit of the vehicle 10, as will be explained. Also, the machine 12 is electrically connected in this case by a cable 18 to receive electrical power from the vehicle 10. The cable attaches by clamps 18a to the appropriate terminals of the vehicle battery. The machine 12 requires no line power (i.e., no 110 volt or 220 volt AC power, for example), and uses only a small current of electrical power from the vehicle 10 to operate a fail-safe function of the machine. As will be seen, an alternative embodiment of the machine 12 can be provided which does not even require this electrical connection to the vehicle 10, and in which the machine 12 operates without any external electrical power input.

The machine 12 includes a cabinet 20 having wheels 22 and a handle 24 providing for the cabinet to be rolled about a service area, for example, to an appropriate position next to a vehicle to be serviced. The machine 12 will be seen to have a very low center of gravity so that it is easily tipped for moving and is stable both while stationary and during such moving on its wheels about a service area. Such low center of gravity is provided by the machine 12 because essentially the entire lower portion 28 of the cabinet defines a reservoir for new transmission fluid, providing an exceptionally low center of gravity for the machine 12. The front of the machine 12 is provided with a vertically extending sight glass 28a (actually formed of break-resistant plastic tubing) providing an indication of the fluid level in the reservoir portion 28 of the machine 12.

Still viewing FIG. 1, it is seen that during service of the transmission of vehicle 10, the vehicle engine is run, and the vehicle may be in neutral or park, or may be on a chassis roller stand allowing the drive wheels of the vehicle to spin with the vehicle stationary. In this situation, the internal pump(s) of the transmission will be operating, and used ATF will flow from the vehicle transmission via hose 14 to the machine 12. During an initial transmission flushing mode of operation, the used ATF (possibly with a flushing chemical added for this phase of transmission cleaning during which varnish and debris in the transmission are loosened for removal) flows back to the transmission via hose 16. In other words, in a flushing mode of operation, the machine 12 completes an external closed fluid flow loop for the transmission.

However, when a service technician actuates switch 30 the machine 12 enters an AFT exchange mode of operation. In this exchange mode of operation, used ATF flows from the transmission to machine 12, and then to a container 32 via a hose 34 for recycling or appropriate disposal. The hose 34 may simply be routed to a large used-fluid storage tank maintained by some service facilities for this purpose. The service area in this case will have access to many conveniently located inlets to this storage tank, and the container 32 will not be needed. Simultaneously, new ATF is supplied by the machine 12 from the reservoir 28 into the transmission of the vehicle via hose 16. While this AFT exchange process is going on the fluid flow rates in the hoses 14 and 16 are substantially matched to one another by the machine 12. Accordingly, the fluid level in the transmission of the vehicle 10 can not drop too low, and transmission damage from dry running can not occur.

In the event the reservoir 28 is allowed to run out of new ATF, the machine 12 will either not enter exchange mode, or will automatically revert from this mode to flush (i.e., recirculation) mode. Again, dry running of the vehicle transmission can not occur. Also, in the event that power to the machine 12 is interrupted (i.e., if one of the clamps 18a becomes disconnected, for example), then the machine 12 reverts instantly to flush mode without the need for manual attention from an attendant and without power being required to effect this reversion to flush mode.

Figure 2:
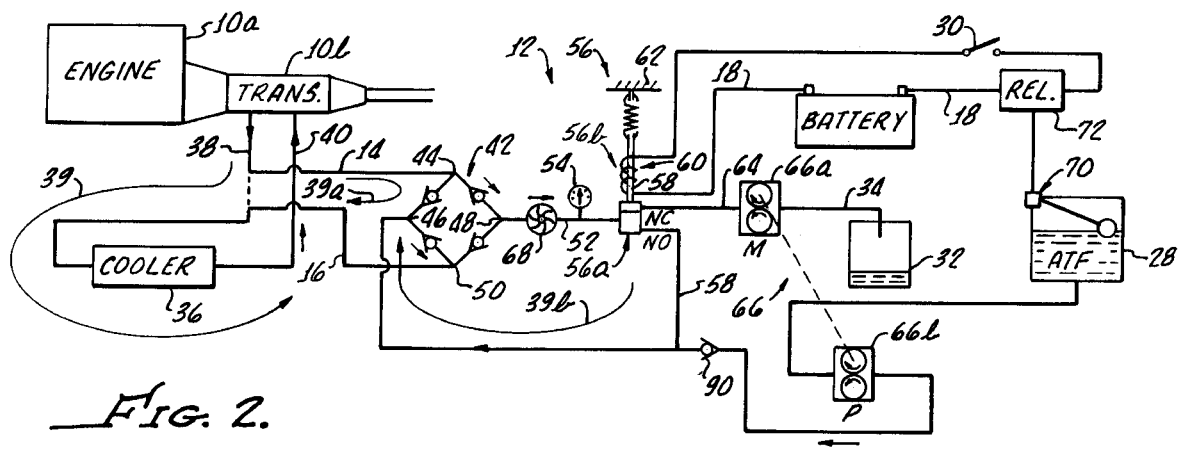

Attention now to FIG. 2 will reveal a schematic of the plumbing and functional structures of the machine 12. The engine and transmission of the vehicle 10 are indicated with numerals 10a and 10b, respectively. Those ordinarily skilled in the pertinent arts will understand that the transmission 10b is associated with a transmission fluid cooler 36 of the vehicle 10. ordinarily, this transmission cooler 36 is built into a portion of the vehicle coolant radiator and is an ATF-to-engine-coolant type. Alternatively, the transmission cooler 36 may be configured as a separate ATF-to-air heat exchanger, which is usually installed behind the grill of the vehicle. In some cases, vehicles are equipped with both types of ATF coolers. The cooler 36 is connected in fluid flow to the transmission 10b by conduits 38 and 40, with ATF flow directions in these conduits being indicated by the arrows on FIG. 2. The conduits 38, 40, and cooler 36 cooperatively define an external closed ATF circulation loop for the transmission lob, which external closed fluid circulation loop is indicated by numeral 39 on FIG. 2.

Conduit 38 is shown in FIG. 2 with a portion of its length depicted in dashed line. When the vehicle 10 is in normal operation, the dashed line portion of conduit 38 is connected together, and fluid flows from the transmission to the cooler 36 along this conduit. However, during service of the transmission using machine 12, one of the conduits 38 or 40 is interrupted as suggested in FIG. 2, and the machine 12 is connected into the previously-closed ATF circulation loop 39 for cooler 36. In FIG. 2, conduit 38 is the one shown opened for connection of machine 12. However, either of the conduits 38 or 40 may be so opened, dependent upon which one is most easily accessible to the service technician on each particular individual vehicle to be serviced. Either of conduits 38 or 40 may be accessed for service of the transmission with absolutely no difference in the effectiveness of the service performed. In preparation for and during the transmission service, the accessed one of the conduits 38 or 40 is interrupted, and after the service is complete the connection of the conduit is restored to its original fluid flow continuity.

Machine 12 includes a fluid-flow rectifier assembly, indicated with numeral 42. This rectifier assembly includes four nodes (or fluid flow confluences and branchings) respectively indicated with numerals 44, 46, 48, and 50; and also includes four check valves each indicated with a respective numeral 52. The check valves 52 are each disposed between a connected pair of the nodes 44–50, and are oriented as shown in FIG. 2. As is seen in FIG. 2, hose 14 connects to node 44, and the hose 16 connects to node 50. The check valves 52 are each oriented so that fluid can flow only to node 48 and only away from node 46. Accordingly, no matter which way the hoses 14 and 16 are connected to the opened ends of the interrupted one of conduits 38 or 40, ATF flow is always from one of nodes 44 or 50 to node 48, and from the other one of nodes 44 and 50 to node 46. Node 48 is connected by a conduit 52 including a pressure gauge 54 and a flow meter 68 to the common port of a spring-loaded three-way solenoid valve 56. The flow meter 68 has a visible indicator 68a of fluid flow, which is displayed on the front of machine 12, as is seen in FIG. 1.

The solenoid valve 56 has a normally-open (N.O.) port from which a conduit 58 connects to node 46. Accordingly, a closed loop fluid flow connection is provided by machine 12 which completes loop 39. This loop within machine 12 is indicated on FIG. 2 with two loop arrows referenced with numerals 39a and 39b. During flush mode of operation as described above, the machine 12 completes the circulation loop 39 by flow of ATF in the internal loop indicated with numerals 39a and 39b of FIG. 2. During this circulation of ATF in the machine 12, the service technician can observe the available pressure provided by the internal pump of the transmission 10b at gauge 54, seen on the front of machine 12 in FIG. 1.

Further considering the three-way solenoid valve 56, it is seen that this solenoid valve includes a valve portion 56a and a solenoid actuator portion 56b. The solenoid actuator portion 56b includes an armature member 58 movably disposed within a solenoid coil 60, and a spring 62 biasing the armature 58 toward a first position. The armature member 58 interacts with the valve portion 56a so that when the armature 58 is in its first position the common port is connected only to the N.O. port of the valve portion 56a. When the solenoid coil 60 is actuated electrically, armature member 58 is moved to a second position (not shown) in which the common port of the valve portion 56b is connected only to the N.C. port of this valve portion. The N.C. port of solenoid valve 56 connects via a conduit 64 to one portion (a motor portion) of a motor/pump unit 66. From this motor portion (indicated with numeral 66a), fluid flows via a hose 34 to the waste-fluid container 34.

The machine 12 is also provided with a float switch 70 at reservoir 28, which electrically allows connection of the common port of solenoid valve 56 to the N.C. port only if a sufficient volume of new ATF is in this reservoir, and which closes if the level of this new ATF falls too low. Float switch 70 controls a relay 72 in circuit with the switch 30, solenoid coil 60, and the battery of the vehicle 10 via cable 18. When the service technician closes switch 30, solenoid coil 60 is actuated if relay 72 allows (i.e., if the float switch 70 indicates a sufficient level of new ATF in the reservoir 28), and the common port of solenoid valve 56 is switched from communication with the N.O. port to communication to the N.C. port. Thus, the internal closed ATF circulation loop of the machine 12 (recalling arrows 39a and 39b) is opened, and used ATF from the transmission 10b flows to waste container 32.

Figure 3:
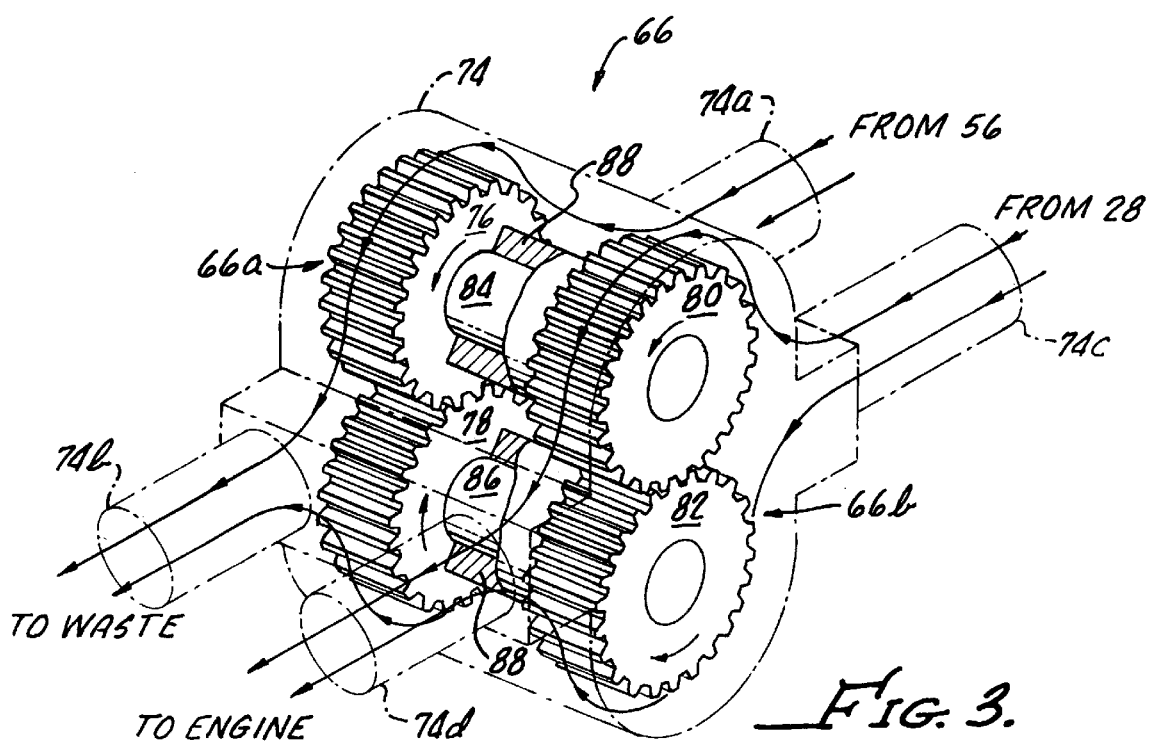

Considering now FIG. 3, it is seen that the motor/pump unit 66 includes a housing 74 defining an inlet port 74a and outlet port 74b from motor portion 66a. Similarly, the housing 74 defines an inlet port 74c and outlet port 74d to and from a pump portion 66b. The motor portion 66a and pump portion 66b are each defined by a meshed pair of spur gears (respectively indicated with numerals 76, 78, 80, and 82. The housing 74 defines closely fitted chambers for these meshed gears, which is conventional in the art of spur-gear pumps and motors. However, in this case, the housing 74 also journals a pair of connecting shafts, indicated with numerals 84 and 86. The shafts 84 and 86 drivingly connect the indicated spur gears for rotation in unison, as is indicated by the arrows on FIG. 3. Thus, as used ATF flows through the motor portion 66a (from port 74a to port 74b) of motor/pump unit 66 the gears 76 and 78 are forced to rotate as indicated, driving the gears 80 and 82 in rotation via shafts 84 and 86. The motor/pump unit 66 is a positive-displacement fluid motor/pump unit, with each side having identically the same fluid displacement per rotation of the gears 76–82 (ignoring some slight and insignificant volume of fluid which may leak from the motor portion to the pump portion of the unit).

Further to the above, it is seen that according to the one illustrated embodiment of the unit 66, the housing 74 carries a pair of elongate plain journal bearings 88 (only a portion of each being seen in FIG. 3 for clarity of illustration). These journal bearings 88 are closely and precisely fitted to the shafts 84 and 86 so that these shafts (and the gears 76–82) are very free running. Importantly, the close fitting of these journal bearings and shafts is relied upon to effect a sufficient fluid seal between the motor side and pump side of the motor/pump 66 so that only an insignificantly small amount of ATF flows along the shafts 84, 86 without the use of a contact type of sealing element. Consequently, no significant mixing of old ATF with new ATF takes place in the motor/pump unit 66. Those ordinarily skilled in the pertinent arts will recognize that other sealing expedients are possible in motor/pump unit 66, and which also provide for free running of the internal components of this unit. For example, a labyrinth seal could be used along the length of the shafts 84 and 86 to inhibit fluid flow between the motor and pump portions of this unit, still without the use of a contact sealing element. Alternatively, a low-friction type of contact sealing element can be used on the shafts 84, 86. This may take the form of, for example, a carbon ring face seal, or a low-friction radial lip seal disposed between the housing 74 and each of the shafts 84, 86. In each case, the motor/pump unit 66 can achieve motoring and pumping operation utilizing only a relatively low fluid pressure provided by the internal pump of transmission 10b. This makes transmission servicing possible even with the engine 10a idling.

Accordingly, during fluid exchange mode new ATF is drawn from reservoir 28, flows from port 74c to port 74d of the pump portion 66b of motor/pump unit 66, and is delivered to the loop 39b via a check valve 90. This new ATF flows to the node 46, and then to the one of the hoses 14 and 16 which is connecting to the connection at the conduits 38 and 40 having the lower pressure.

It will be recalled in view of the above, that fluid flow in the apparatus seen in FIG. 2 is being impelled entirely by the internal pump of the automatic transmission 10b. Accordingly, there is a progressive pressure drop along the length of all flow paths, and the fluid flow at the connections to one of conduits 38 and 40 will be differentiated from one another by this fluid pressure differential. Accordingly, no matter which one of the conduits 38 or 40 is interrupted for transmission service, and no matter which way the hoses 14 and 16 are connected to the open ends of the interrupted conduit 38 or 40, flow of used ATF will be from one of these open ends of the interrupted conduit 38 or 40, and flow of new ATF will be delivered by the machine 12 into the other open end of the interrupted conduit.

In other words, the circulation loop 39 of the transmission is complete during flush mode and appears to be complete during exchange mode also, but new ATF is being supplied by the machine 12 in response to and in matching volume to the pumping out of old ATF by the transmission 10b during exchange mode. During this fluid exchange mode of operation, the technician can verify that fluid is flowing by observing the indicator 68a of flow meter 68. Preferably, this flow meter is a turbine type with a transparent wall though which the technician can not only seen the spinning turbine, but can also observe the color and turbidity of the ATF flowing from the transmission to waste (i.e., this is visible on the front of machine 12 as seen in FIG. 1). Thus, when the out-flowing ATF is observed to change from the turbid burnt-umber of old fluid to the clear bright red of new fluid, the technician knows that the flushing and fluid exchanging operation is complete.

To repeat, in the event the level of new ATF in reservoir 28 drops too low during the service process, and even if the attendant is not present, the float switch 70 will open electrically, and as a result the spring-loaded solenoid will return valve 56a to the position connecting the common port only to the N.O. port. This takes place due to its own spring bias and the fact that the solenoid actuator 56b can be back-driven by this spring bias.

Thus, in the event of cessation of operation of the machine 12 (because of interruption of electrical power, for example) or a shortage of fresh transmission fluid, the loop 39 is restored, withdrawal of transmission fluid stops, and the transmission 10b can not run out of fluid or be damaged by dry running.

When the process described above is complete, the technician disconnects the machine 12 at the connections to one of the conduits 38 or 40, restores the circulation loop 39, and sends the old transmission fluid for disposal or to a recycling facility.

Figure 4:
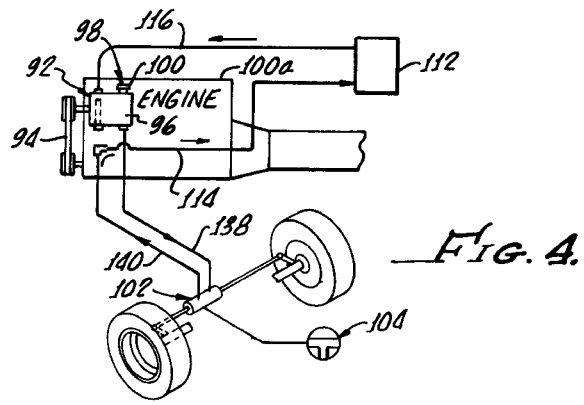

FIG. 4 schematically illustrates an alternative embodiment of the present invention, in which a machine is used to service the power steering system of a vehicle to exchange old fluid from the system with new fluid. In order to obtain reference numerals for use in describing this alternative embodiment of the invention, features which are either the same as those depicted and described above, or which are analogous in structure or function, are referenced in FIG. 4 using the same numeral used above, and having one-hundred (100) added.

Viewing now FIG. 4, a vehicle includes an engine 110a driving a power steering pump 92 by means of a belt 94. This pump 92 includes a reservoir portion 96 disposed generally above the pump 92. The reservoir portion 96 has a fill opening 98 closed by a cap 100. Also, a low-pressure hose 140 connects onto a fitting on the body of the reservoir portion 96 in order to allow return of low pressure power steering fluid into this reservoir. During operation of the engine, the pump 92 draws power steering fluid from the reservoir portion 96, and delivers this fluid pressurized via a high-pressure hose or conduit 138 to a power steering unit 102. The power steering unit 102 is connected to the dirigible wheels of the vehicle, and has a steering input from a steering wheel 104.

Now, in order to allow a machine 112 to be used in exchanging fluid from the power steering system seen in FIG. 4, the low pressure hose 140 is interrupted or disconnected at its connection to the fitting at reservoir portion 96. This disconnection of the hose 140 allows it to be connected to one of the hoses 114 or 116 of the machine 112. In view of the explanation above of the hydraulic rectifier 42, it will be appreciated that either hose 114 or hose 116 may be connected to receive low-pressure power steering fluid from the system as depicted. The other hose 114 or 116 from machine 112 is either attached to the fitting on the reservoir 96 from which hose 140 was disconnected, or is simply routed so as to deliver fluid into the reservoir 96 via fill opening 98.

Accordingly, when the engine 110a is operated, the pump 92 is powered and delivers high-pressure power steering fluid to the unit 102. Power steering fluid at a lower pressure flows from the unit 102 via hose 140, but is routed to machine 112 rather than flowing into reservoir 96. This power steering fluid is routed to machine 112, where it powers a motor/pump unit as described above. The machine 112 is provided with a source of new power steering fluid, which will be easily understood in view of the description above of providing machine 12 with a source of automatic transmission fluid. The motor/pump unit of the machine 112 delivers new power steering fluid at a matching volume rate to the reservoir 96 of the pump 92 via hose 116. It will be recalled that hoses 114, and 116 can be reversed in function, as will be appreciated in view of the operation of the hydraulic rectifier of machine 12 as described above. In this way, the old power steering fluid is removed from the system depicted in FIG. 4, and the system is provided with new power steering fluid.

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, it is apparent that an alternative embodiment of the machine 12 can be provided which requires no electrical power at all for its operation. That is, the solenoid valve 56 may be replaced by a manually-actuated three-way valve. In this case, the service technician must manually revert the machine from exchange mode to flush mode when delivery of the new ATF into the transmission is completed.

Alternatively, the manually-actuated three-way valve could be spring loaded to its position completing internal loop 39a/b, and could be latched into its position effecting exchange mode for the machine. In this alternative, a triggering device could be used in response to the dropping of a float in reservoir 28 to cause release of the latched three-way valve and reversion of the machine to flush mode. For example, a float switch could be used and an internal battery of the machine 12 could trigger a solenoid which releases the latch of the three-way valve. Still alternatively, a float-trigger could be connected from the reservoir directly to a mechanical latch release (i.e., a sear device) to release the latched three-way valve and allow its own spring to revert the machine to flush mode. In these ways, the machine 12 may be modified to be fail-safe and either not require any electrical power from the vehicle (i.e., because of use of a battery internal to the machine 12) or to using a mechanical latch and release device (i.e., the float-trigger alternative) so that minimal attention from an attendant is required but fail-safe operation is still assured.

Another alteration which will suggest itself is to provide a torque motor connected in driving relationship to the motor/pump unit 66. This torque motor can be arranged to assist but not drive rotation of this motor/pump unit in the direction that it is driven by old ATF being pumped out of a transmission under service. Accordingly, those vehicles which have an internal pump maintaining only a relatively low fluid pressure which is perhaps not enough to drive the motor/pump unit without assistance can still be serviced with the present machine. A slight assistance to the motor/pump unit 66 by operation of such a torque motor would be enough to still effect the positive displacement fluid exchange under the impetus of the internal transmission pump according to the present invention.

Thus, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A method of exchanging used ATF with new ATF in an automotive automatic transmission having an internal pump and an external fluid circulation loop, said method comprising steps of:

providing a volume of new ATF;

connecting a positive displacement motor/pump unit into said external fluid circulation loop, so that said loop is opened and old ATF from the transmission flows via a rotary motor portion of the motor/pump unit to waste by reason of pressure provided by said internal transmission pump and drives a pump portion of said motor/pump unit, and flowing new ATF from said volume through said pump portion of said motor/pump unit to said automatic transmission so as to effect a pseudo-closing of said external fluid circulation loop, whereby used ATF pumped out of said transmission by said internal pump is continuously replaced in substantially equal volume with new ATF from said volume by said motor/pump unit.

2. A fail-safe method of exchanging ATF in an automatic transmission, said method comprising steps of:

providing an external ATF circulation loop for the transmission;

including in said external ATF circulation loop only a single three-way valve in a first position communicating ATF in said external ATF circulation loop and in a second position opening said external ATF circulation loop and directing ATF from the transmission to waste;

yieldably biasing said only a single three-way valve to said first position;

providing an actuating device which when actuated reversibly moves said only a single three-way valve to said second position thereof;

providing a supply of new ATF;

providing a sensor indication when supply of new ATF is adequate;

operating a pump to add the new ATF to the transmission;

providing a control system allowing actuation of said actuating device only when said sensor indicates an adequate supply of new ATF; and in the event said actuating device is deactivated by said control system, using said resilient bias to return said only a single three-way control valve from said second position to said first position thereby restoring said external ATF circulation loop.

3. A fail-safe transmission fluid exchange machine for an automotive automatic transmission, which automatic transmission includes an internal pump moving automatic transmission fluid (ATF) through an external circulation loop, said machine comprising:

a conduit for conducting ATF from said external ATF circulation loop, only a single three-way valve in a first position communicating ATF received via said first conduit from said external circulation loop to a second conduit, which second conduit returns ATF to said external ATF circulation loop, said only a single three-way valve in a second position thereof communicating ATF from said external ATF circulation loop to waste;

a yieldably-biased back-drivable actuator which when actuated moves said only a single three-way valve from said first to said second position thereof and which when deactivated returns said only a single three-way valve to said first position by self-bias;

a container for holding a supply of new ATF;

a sensor for indicating when said container holds an adequate supply of new ATF;

a pump receiving new ATF from said container therefor and supplying said new ATF pressurized via said second conduit to said external ATF circulation loop; a control system interconnecting said sensor and said actuator to allow actuation of said actuator to place said only a single three-way valve in said second position only while said sensor indicates an adequate supply of new ATF, said control system deactivating said actuator in the event of an inadequate supply of new ATF to allow said only a single three-way valve to be returned to said first position by self-bias of said actuator.

4. The fail-safe transmission fluid exchange machine of claim 3 further including a hydraulic motor driven by used ATF pumped from said transmission by said internal pump and driving said pump of said fluid exchange machine.

5. The fail-safe transmission fluid exchange machine of claim 4 wherein said motor and said pump of said fluid exchange machine are drivingly coupled to one another for operation simultaneously in unison, and each of said motor and said pump displace an equal volume of fluid.

6. A fail-safe transmission fluid exchange machine for an automotive automatic transmission, which automatic transmission includes an internal pump moving automatic transmission fluid (ATF) through an external circulation loop, said machine comprising:

a conduit for conducting ATF from said external ATF circulation loop, a three-way valve in a first position communicating ATF received via said first conduit from said external circulation loop to a second conduit, which second conduit returns ATF to said external ATF circulation loop, said three-way valve in a second position thereof communicating ATF from said external ATF circulation loop to waste;

a yieldably-biased back-drivable actuator which when actuated moves said three-way valve from said first to said second position thereof and which when deactivated returns said three-way valve to said first position by self-bias;

a container for holding a supply of new ATF;

a sensor for indicating when said container holds an adequate supply of new ATF;

a pump receiving new ATF from said container therefor and supplying said new ATF pressurized via said second conduit to said external ATF circulation loop;

a control system interconnecting said sensor and said actuator to allow actuation of said actuator to place said three-way valve in said second position only while said sensor indicates an adequate supply of new ATF, said control system deactivating said actuator in the event of an inadequate supply of new ATF to allow said three-way valve to be returned to said first position by self-bias of said actuator;

a hydraulic motor driven by used ATF pumped from said transmission by said internal pump and driving said pump of said fluid exchange machine; and wherein said motor and said pump of said fluid exchange machine are configured as a motor/pump unit having a pair of meshed gears in each of a pumping cavity and in a motor cavity, a shaft driven by said pair of meshed gears in said motor cavity drivingly connecting with said pair of gears in said pumping cavity, and said housing carrying a journal bearing defining in cooperation with said shaft a free-running fit with said shaft which resists fluid flow between said cavities without use of a contact seal element.

7. A fail-safe transmission fluid exchange machine for an automotive automatic transmission, which automatic transmission includes an internal pump moving automatic transmission fluid (ATF) through an external circulation loop, said machine comprising:

a conduit for conducting ATF from said external ATF circulation loop, a three-way valve in a first position communicating ATF received via said first conduit from said external circulation loop to a second conduit, which second conduit returns ATF to said external ATF circulation loop, said three-way valve in a second position thereof communicating ATF from said external ATF circulation loop to waste;

a yieldably-biased back-drivable actuator which when actuated moves said three-way valve from said first to said second position thereof and which when deactivated returns said three-way valve to said first position by self-bias;

a container for holding a supply of new ATF;

a sensor for indicating when said container holds an adequate supply of new ATF;

a pump receiving new ATF from said container therefor and supplying said new ATF pressurized via said second conduit to said external ATF circulation loop;

a control system interconnecting said sensor and said actuator to allow actuation of said actuator to place said three-way valve in said second position only while said sensor indicates an adequate supply of new ATF, said control system deactivating said actuator in the event of an inadequate supply of new ATF to allow said three-way valve to be returned to said first position by self-bias of said actuator;

further including a hydraulic rectifier allowing either of said first conduit or said second conduit to be connected in said external fluid circulation loop of said transmission so as to receive old ATF pumped by the internal pump of the transmission, and allowing either one of said first conduit or said conduit to be connected into the external fluid circulation loop of the transmission so as to deliver new ATF to the circulation loop;

said hydraulic rectifier including four fluid flow nodes, each of said four nodes being in direct fluid flow communication with two other of said four nodes, two of said nodes being bi-directional nodes which may receive fluid from said transmission or send fluid to said transmission, and a different two of said four nodes being respectively one an inflow node at which said machine receives old ATF from the transmission and an outflow node to which the machine delivers new ATF, said first and said second conduits each connecting to a respective one of said bi-directional nodes; and four check valves interposed each one between two directly communicating nodes, said check valves being disposed such as to allow flow from each bi-directional node only to said inflow node and only from said outflow node to each of said bi-directional nodes.

8. In a machine for exchanging used ATF from an automotive automatic transmission with new ATF, said machine having:

a source of new ATF;

a pump unit flowing new ATF from said source to said automatic transmission; and a hydraulic rectifier including four fluid flow nodes, each of said four nodes being in direct fluid flow communication with two other of said four nodes, two of said nodes being bi-directional nodes which may receive old ATF from said transmission or send new ATF to said transmission, and a different two of said four nodes being respectively one an inflow node at which said machine receives old ATF from the transmission and an outflow node to which the machine delivers new ATF; and four check valves, each interposed one between two directly communicating nodes, said check valves being disposed such as to allow flow from each bi-directional node only to said inflow node and only from said outflow node to each of said bi-directional nodes.

9. A method of exchanging used power steering fluid with new power steering fluid in an automotive power steering system having a power steering pump and a fluid circulation loop including a power steering gear and a fluid reservoir, said method comprising steps of:

providing a source of new power steering fluid;

connecting a positive displacement motor/pump unit into said fluid circulation loop, so that said loop is opened and old power steering fluid flows from said power steering gear via a rotary motor portion of the motor/pump unit to waste by reason of pressure provided by said power steering pump and drives the pump portion of said motor/pump unit, and flowing new power steering fluid from said source through said pump portion of said motor/pump unit to said reservoir, whereby used power steering fluid pumped out of said power steering gear by said power steering pump is continuously replaced in equal volume with new power steering fluid from said source by said motor/pump unit.

10. A fail-safe machine for exchange of power steering fluid in an automotive vehicle, which vehicle includes a power steering system with a power steering pump, a reservoir providing power steering fluid to said power steering pump, and a power steering gear receiving high-pressure pressurized power steering fluid from said power steering pump via a high-pressure conduit and returning low-pressure power steering fluid to said reservoir via a low-pressure conduit, said machine comprising:

a first conduit conducting used power steering fluid from said low-pressure conduit to a single three-way valve;

said single three-way valve in a first position communicating power steering fluid received via said first conduit to a second conduit, which second conduit returns power steering fluid to said reservoir, said single three-way valve in a second position thereof communicating power steering fluid to waste;

a yieldably-biased back-drivable actuator which when actuated moves said single three-way valve from said first to said second position thereof and which when deactivated returns said single three-way valve to said first by self-bias;

a container for holding a supply of new power steering fluid;

a sensor for indicating when said container holds an adequate supply of new power steering fluid;

a pump receiving new power steering fluid from said container therefor and supplying said new power steering fluid via said second conduit to said reservoir;

a control system interconnecting said sensor and said actuator to allow actuation of said actuator to place said single three-way valve in said second position only while said sensor indicates an adequate supply of new power steering fluid in said container, said control system deactivating said actuator in the event of an inadequate supply of new power steering fluid to allow said single three-way valve to be returned to said first position by self-bias of said actuator.

11. The fail-safe power steering exchange machine of claim 10 further including a hydraulic motor driven by used power steering fluid pumped from said power steering system by said power steering pump and driving said pump of said machine.

12. A fail-safe machine for exchange of power steering fluid in an automotive vehicle, which vehicle includes a power steering system with a power steering pump, a reservoir providing power steering fluid to said power steering pump, and a power steering gear receiving high-pressure pressurized power steering fluid from said power steering pump via a high-pressure conduit and returning low-pressure power steering fluid to said reservoir via a low-pressure conduit, said machine comprising:

a first conduit conducting used power steering fluid from said low-pressure conduit to a three-way valve;

said three-way valve in a first position communicating power steering fluid received via said first conduit to a second conduit, which second conduit returns power steering fluid to said reservoir, said three-way valve in a second position thereof communicating power steering fluid to waste;

a yieldably-biased back-drivable actuator which when actuated moves said three-way valve from said first to said second position thereof and which when deactivated returns said three-way valve to said first position by self-bias;

a container for holding a supply of new power steering fluid;

a sensor for indicating when said container holds an adequate supply of new power steering fluid;

a pump receiving new power steering fluid from said container therefor and supplying said new power steering fluid via said second conduit to said reservoir;

a control system interconnecting said sensor and said actuator to allow actuation of said actuator to place said three-way valve in said second position only while said sensor indicates an adequate supply of new power steering fluid in said container, said control system deactivating said actuator in the event of an inadequate supply of new power steering fluid to allow said three-way valve to be returned to said first position by self-bias of said actuator; and further including a hydraulic rectifier allowing either of said first conduit or said second conduit to be connected to said low-pressure conduit of said power steering system to receive power steering fluid at low-pressure therefrom, and allowing either one of said first conduit or said second conduit to deliver new power steering fluid into said reservoir;

said hydraulic rectifier including:

four fluid flow nodes, each of said four nodes being in direct fluid flow communication with two other of said four nodes, two of said nodes being bi-directional nodes which may receive fluid from said power steering system or send fluid to said power steering system, and a different two of said four nodes being respectively one an inflow node at which said machine receives old power steering fluid from the power steering system of the vehicle and an outflow node to which the machine delivers new power steering fluid, said first and said second conduits each connecting to a respective one of said bi-directional nodes; and four check valves interposed each one between two directly communicating nodes, said check valves being disposed such as to allow flow from each bi-directional node only to said inflow node and only from said outflow node to each of said bi-directional nodes.

13. A fail-safe transmission fluid exchange machine for an automotive automatic transmission, which automatic transmission includes an internal pump moving automatic transmission fluid (ATF) through an external ATF cooler in a circulation loop, said machine comprising:

a conduit for conducting ATF from said circulation loop to a common port of a three-way valve, said three-way valve in a first position communicating ATF received via said first conduit from said circulation loop to a second conduit via a normally-open (N.O.) port, which second conduit returns ATF to said circulation loop, said three-way valve in a second position thereof communicating ATF from said circulation loop via a normally-closed (N.C.) port to waste;

a yieldably-biased back-drivable actuator which when actuated moves said three-way valve from said first to said second position thereof and which when deactivated returns said three-way valve to said first position by self-bias;

a container for holding a supply of new ATF;

a sensor for indicating when said container holds an adequate supply of new ATF;

a motor/pump unit having a motor portion disposed in fluid flow series between said N.C. port of said three-way valve and waste to be driven by ATF pumped out of said transmission; and a pump portion receiving new ATF from said container therefor and supplying said new ATF pressurized via said second conduit to said circulation loop, said motor portion and said pump portion of said motor/pump unit being drivingly coupled to one another for operation simultaneously in unison with each displacing an equal volume of fluid;

a control system interconnecting said sensor and said actuator to allow actuation of said actuator to place said three-way valve in said second position only while said sensor indicates an adequate supply of new ATF, said control system deactivating said actuator in the event of an inadequate supply of new ATF to allow said three-way valve to be returned to said first position by self-bias of said actuator;

a hydraulic rectifier allowing either of said first conduit or said second conduit to be connected in said circulation loop of said transmission so as to receive old ATF pumped by the internal pump of the transmission, and allowing either one of said first conduit or said second conduit to be connected into the circulation loop of the transmission so as to deliver new ATF to the circulation loop; said hydraulic rectifier including four fluid flow nodes, each of said four nodes being in direct fluid flow communication with two other of said four nodes, two of said nodes being bi-directional nodes which may receive fluid from said transmission or send fluid to said transmission, and a different two of said four nodes being respectively one an inflow node at which said machine receives old ATF from the transmission and an outflow node to which the machine delivers new ATF, said first and said second conduits each connecting to a respective one of said bi-directional nodes; and four check valves interposed each one between two directly communicating nodes, said check valves being disposed such as to allow flow from each bi-directional node only to said inflow node and only from said outflow node to each of said bi-directional nodes.

14. A method of exchanging used ATF with new ATF in an automotive automatic transmission having an internal pump and an external fluid circulation loop, said method comprising steps of:

providing a volume of new ATF;

connecting a positive-displacement motor/pump unit into said external fluid circulation loop, so that said loop is opened and old ATF from the transmission flows via a motor portion of the motor/pump unit to waste by reason of pressure provided by said internal transmission pump and drives a rotary pump portion of said motor/pump unit, and flowing new ATF from said volume through said rotary pump portion of said motor/pump unit to said automatic transmission so as to effect a pseudo-closing of said external fluid circulation loop, whereby used ATF pumped out of said transmission by said internal pump is continuously replaced in substantially equal volume with new ATF from said volume by said motor/pump unit.

15. A method of exchanging used ATF with new ATF in an automotive automatic transmission having an internal pump and an external fluid circulation loop, said method comprising steps of:

providing a volume of new ATF;

connecting a positive-displacement rotary motor/pump unit into said external fluid circulation loop, so that said loop is opened and old ATF from the transmission flows via a rotary motor portion of the motor/pump unit to waste by reason of pressure provided by said internal transmission pump and drives a rotary pump portion of said motor/pump unit, and flowing new ATF from said source through said rotary pump portion of said rotary motor/pump unit to said automatic transmission so as to effect a pseudo-closing of said external fluid circulation loop, whereby used ATF pumped out of said transmission by said internal pump is continuously replaced in substantially equal volume with new ATF from said volume by said rotary motor/pump unit.

16. A method of exchanging used power steering fluid with new power steering fluid in an automotive power steering system having a power steering pump and a fluid circulation loop including a power steering gear and a fluid reservoir, said method comprising steps of:

providing a source of new power steering fluid;

connecting a positive displacement motor/pump unit into said fluid circulation loop, so that said loop is opened and old power steering fluid flows from said power steering gear via a motor portion of the motor/pump unit to waste by reason of pressure provided by said power steering pump and drives a rotary pump portion of said motor/pump unit, and flowing new power steering fluid from said source through said rotary pump portion of said motor/pump unit to said reservoir, whereby used power steering fluid pumped out of said power steering gear by said power steering pump is continuously replaced in equal volume with new power steering fluid from said source by said motor/pump unit.

17. A method of exchanging used power steering fluid with new power steering fluid in an automotive power steering system having a power steering pump and a fluid circulation loop including a power steering gear and a fluid reservoir, said method comprising steps of:

providing a source of new power steering fluid;

connecting a positive displacement rotary motor/pump unit into said fluid circulation loop, so that said loop is opened and old power steering fluid flows from said power steering gear via a rotary motor portion of the rotary motor/pump unit and to waste by reason of pressure provided by said power steering pump and drives the rotary pump portion of said motor/pump unit, and flowing new power steering fluid from said source through said rotary pump portion of said rotary motor/pump unit to said reservoir, whereby used power steering fluid pumped out of said power steering gear by said power steering pump is continuously replaced in substantially equal volume with new power steering fluid from said source by said rotary motor/pump unit.

* * * * *